S. B. ROBISON.
CHURNS.
No. 180,275. Patented July 25, 1876.
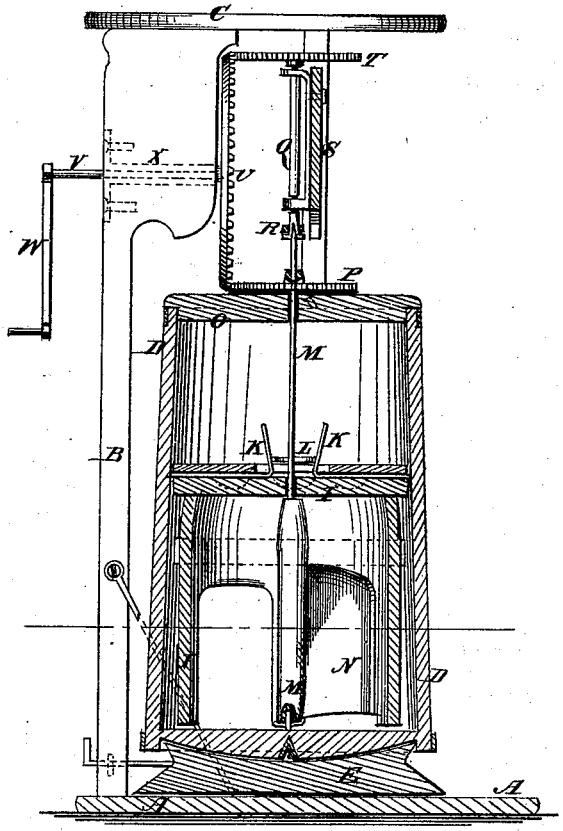
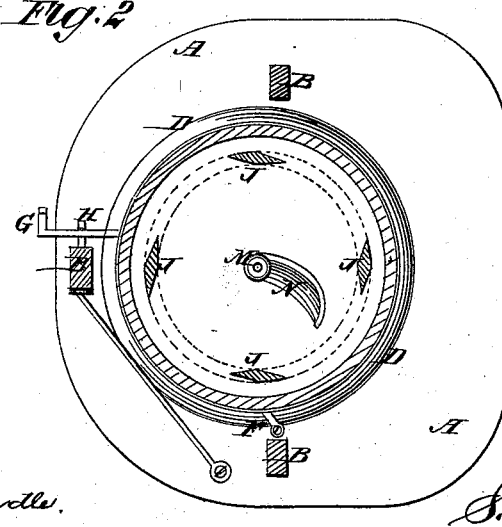
WITNESSES:
Francis McArdle.
John Goethals
INVENTOR:
S. B. Robison
BY
ATTORNEYS.

UNITED STATES PATENT OFFICE.

SYLVANUS B. ROBISON, OF ALLENVILLE, MISSOURI.

IMPROVEMENT IN CHURNS.

Specification forming part of Letters Patent No. 180,275, dated July 25, 1876; application filed June 6, 1876.

*To all whom it may concern:*

Be it known that I, SYLVANUS B. ROBISON, of Allenville, in the county of Worth and State of Missouri, have invented a new and useful Improvement in Churning Apparatus, of which the following is a specification:

Figure 1 is a vertical section of my improved churning apparatus. Fig. 2 is a horizontal section of the same, taken through the line $x$ $x$, Fig. 1. Fig. 3 is a detail cross section of the rotating dasher.

The object of this invention is to furnish an improved churning apparatus, which shall be so constructed that the churn may be readily put into place and detached, which will enable the gear-wheels to be readily adjusted to take up the wear, and will bring the butter in a very short time.

The invention consists in the combination of the block, provided with the hinge and the latch, with the platform and posts of the frame; in the combination of the stationary dasher, provided with the bolts and spring; and the rotating dasher, with the churn-body and the driving mechanism.

A is the base or platform of the apparatus, to the side and back parts of which are attached the lower ends of three posts, B, at such a distance apart as to receive the churn between them. The upper ends of the posts B are connected and held in their proper relative positions by the top or cap plate C, to which they are attached. D is the churn, the bottom of which is made convex upon its lower side, and has a socket formed in its center to receive a pivot attached to the center of the concaved upper side of the block E. The block E is connected at one side to one of the side posts B by a hinge, F, so that it may be swung out from between the posts for convenience in putting the churn upon and removing it from the said block. To the rear side of the block E is attached a latch, G, to latch upon a catch, H, attached to the rear part B, to hold the said block E securely in place while the churning is being done. I is a disk, which fits into the interior of the churn D, and has four, more or less, arms, J, attached to it, which project down to, or nearly to, the bottom of the churn D, and the upper parts of which may be connected together, and may be strengthened by a hoop. The forward edges of the arms J are beveled upon both their outer and inner sides to throw the milk toward the walls and toward the center of the churn. The dasher I J is kept from turning in the churn by two bolts, K, that slide in keepers attached to the top of the disk I. The inner ends of the bolts K are bent upward, and have the arms of a U-spring, L, placed between them to hold their outer ends pressed against the sides of the churn D. To the center of the bottom of the churn D is attached a pivot to receive the lower end of a shaft, M, to the lower part of which is attached, or upon it is formed, a blade or paddle, N, the forward side of which is concaved to gather the milk and throw it toward the walls of the churn D. The shaft M passes up through the center of the stationary dasher I J, through the center of the churn-cover O, through the center of the gear-wheel P, attached to said cover O, and its upper end is flattened, and fits into a slot formed in the lower end of the shaft Q, where it is secured in place by a ring, R, slipped down upon the lapped ends of the said shafts M Q. The lower ends of the forks or branches of the shaft Q are bent outward to keep the ring R from dropping off. The shaft Q revolves in bearings attached to a cross-bar or plate, S, secured to the upper parts of the side posts B. To the upper end of the shaft Q is attached a gear-wheel, T, the teeth of which mesh into the teeth of the gear-wheel U upon the upper side, while the teeth of the gear-wheel P mesh into the teeth upon the lower side of said wheel U. The large gear-wheel U is attached to the end of the shaft V, to the other end of which is attached the crank W, by which the churn is operated. The shaft V passes through and revolves in a long box, X, inserted in a hole in the thickened upper part of the back part B, and the forward end of which rests against the hub of the gear-wheel U, so that the wear of the gear-wheels may be taken up by moving the said box X forward.

By this construction the dasher M N will be revolved in one direction by the upper gear-wheel T, and the stationary dasher I J and the churn-body D will be revolved in the other direction by the lower gear-wheel P attached to the cover O. The cover O is made to carry the churn-body D with it in its revolution by the pins or points $d'$ inserted in the top edge of the churn-body D, and which enter the said cover O.

Having thus described my invention, I claim as new and desire to secure by Letters Patent—

1. The combination of the block E, provided with the hinge F, and the latch G H, with the platform A and posts B, substantially as herein shown and described.

2. The combination of the stationary dasher I J, provided with the bolts K and spring L, and the rotating dasher M N, with the churn-body D and the driving mechanism P T U V W, substantially as herein shown and described.

SYLVANUS BRADFIELD ROBISON.

Witnesses:
    ALFRED C. ROBISON,
    WILLIAM E. BEAVERS.